(No Model.)
E. L. TAYLOR.
Car Wheel.
No. 234,502. Patented Nov. 16, 1880.
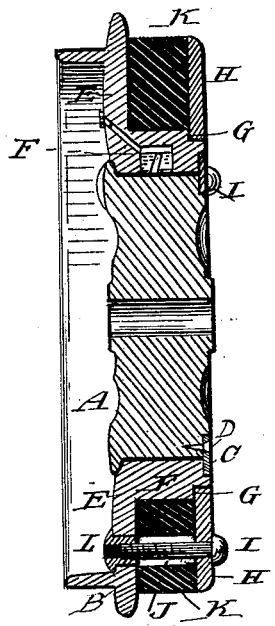
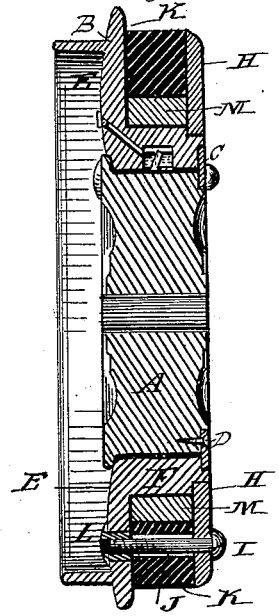
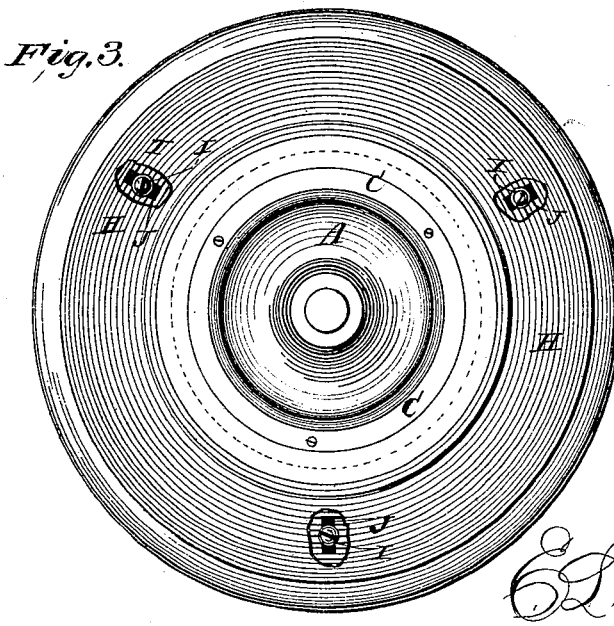
WITNESSES
INVENTOR

UNITED STATES PATENT OFFICE.

ENOCH L. TAYLOR, OF PENNSBURG, PENNSYLVANIA.

CAR-WHEEL.

SPECIFICATION forming part of Letters Patent No. 234,502, dated November 16, 1880.

Application filed April 17, 1880. (No model.)

*To all whom it may concern:*

Be it known that I, ENOCH L. TAYLOR, of Pennsburg, in the county of Montgomery and State of Pennsylvania, have invented certain new and useful Improvements in Car-Wheels; and I do hereby declare that the following is a full, clear, and exact description of the invention, which will enable others skilled in the art to which it appertains to make and use the same, reference being had to the accompanying drawings, which form a part of this specification.

Figure 1 is a vertical sectional view of the wheel as adapted for use upon elevated roads. Fig. 2 is a vertical sectional view, showing a modification; and Fig. 3 is a side view of the wheel shown in Fig. 2.

Corresponding parts in the several figures are denoted by like letters of reference.

This invention relates to railroad-car wheels; and it consists in certain improvements in the construction of the same, which will be hereinafter fully described, and particularly pointed out in the claim.

In the drawings hereto annexed, A represents a cast-metal disk, which forms the hub of my improved wheel, and which is secured in the usual manner upon the car-axle. The hub A is fitted within a tire, B, to which it is secured by means of a ring or collar, C, fitted in an annular recess in the inner edge of the tire and the outer edge of the hub, to which latter it is secured by bolts or screws D, or in some other suitable manner. The hub A, it will thus be seen, may revolve freely within the tire, for purposes to be hereinafter described.

The tire B consists of a plate, E, provided with a collar, F, to receive the hub, said collar being provided with an annular recess, G, to receive the outer ring or plate, H, which is connected to plate E by bolts I passing through slots J in the tread ring or band K, which latter is placed around the collar F, as shown. The nuts L of bolts I are, by preference, countersunk in the plate E, to render the said bolts easily detachable in the event of breakage.

By the modified construction shown in Fig. 2 the tread-ring K is made of metal, and between it and the collar F is interposed a packing-ring, M, of rubber or other suitable material, for the purpose of deadening the sound.

When curves are turned upon railroads the outside wheels, having the greatest distance to accomplish, are compelled to slide or jump upon the track, thereby creating great and unpleasant noise, besides the wear and danger to the rolling-stock and train caused thereby.

By my improvement the hub is enabled to revolve in the tire, thus doing away with these objections. The construction is simple and the expense not much in excess of ordinary car-wheels.

Suitable lubricating devices should be provided for the purpose of reducing the friction between the hub and tire.

Having thus described my invention, I claim and desire to secure by Letters Patent of the United States—

The combination, with the hub A, of a tire fitted to revolve upon said hub, said tire consisting of plate E, having collar F, tread ring or rings having slots J, plate H, and bolts and nuts I L, as set forth.

In testimony that I claim the foregoing as my own I have hereto affixed my signature in presence of two witnesses.

ENOCH LEWIS TAYLOR.

Witnesses:
WILLIAM DAY,
AARON K. STAUFFER.